Chandler & Estell.
School Desk.
No. 3,456. Fig. 1. Reissued May 25, 1869.
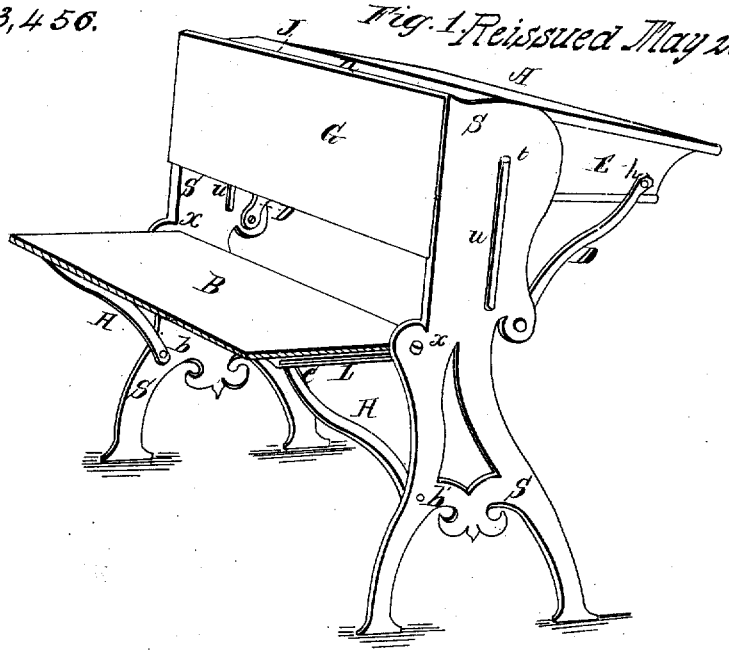
Fig. 2.
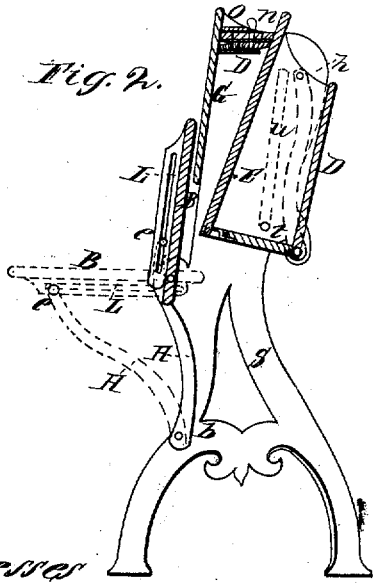
Fig. 3.
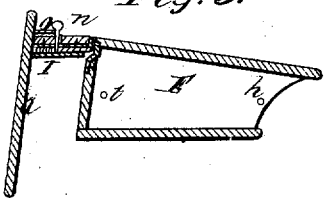
Witnesses
Joseph Ridge
W. P. Estell
Inventor
Aaron Chandler
Samuel P. Estell
Artemas Roberts
Attys
N. PETERS, PHOTO-LITHOGRAPHER, WASHINGTON, D. C.

United States Patent Office.

AARON CHANDLER, OF DAVENPORT, IOWA, AND SAMUEL F. ESTELL, OF RICHMOND, INDIANA.

*Letters Patent No.* 87,025, *dated February* 16, 1869; *reissue No.* 3,456, *dated May* 25, 1869.

IMPROVED FOLDING DESK.

The Schedule referred to in these Letters Patent and making part of the same.

*To all whom it may concern:*

Be it known that we, AARON CHANDLER, of Davenport, Iowa, and SAMUEL F. ESTELL, of Richmond, Indiana, have invented a new and useful Improvement in Folding School-Desks; and we do hereby declare that the following is a full and exact description thereof, reference being had to the accompanying drawings, in which—

Figure 1 is a perspective view;

Figure 2, a vertical cross-section; and

Figure 3 is a cross-section, showing the book-box and its relation to some of the stationary parts of the desk.

The same letters in the different figures refer to corresponding parts.

To enable others skilled in the art to make and use our invention, we will proceed to describe the construction thereof.

A represents the book-box, the end-pieces E of which are made of cast-iron.

S S are the standards, to which is secured the seat-back G.

A stationary strip, J, of sufficient width to hold the ink-well, is secured at the top of the standards.

The book-box is connected with the standards by means of pins *t*, that slide in slots *u* in said standards, and by the braces D, which latter are pivoted to the standards, and also to the book-box.

Fig. 1 shows the book-box in position for use, in which position it is supported by means of a spring-catch, I, as shown in fig. 3, or by means of some other simple and convenient arrangement for that purpose. The book-box is folded by sliding it down, by means of the pins *t* and slots *u*, which, with the action of the braces D, partially revolves it, and brings it in a position vertical, or nearly so, within the standards, as shown in fig. 2.

Having thus fully described our said invention,

What we claim, and desire to secure by Letters Patent, is—

In combination with the book-box A, the slots *u*, in the standards S S, the pins *t*, and pivoted braces D, substantially as described and for the purpose set forth.

AARON CHANDLER.
SAML. F. ESTELL.

Witnesses:
JOSEPH RIDGE,
SMITH RAILSBACK.